Patented June 2, 1931

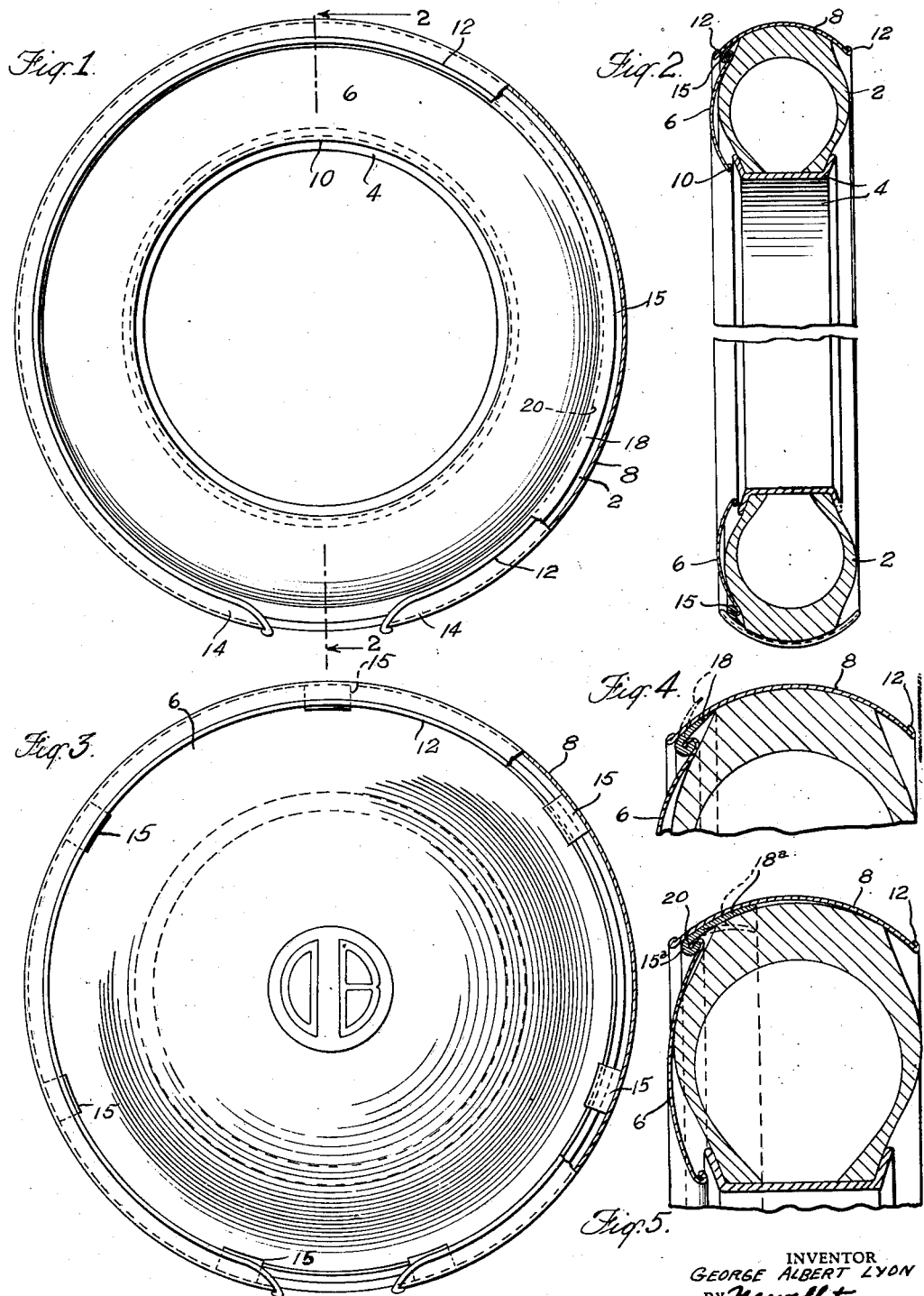

1,807,697

UNITED STATES PATENT OFFICE

GEORGE ALBERT LYON, OF ALLENHURST, NEW JERSEY

COVER FOR SPARE TIRES OF AUTOMOBILES

Application filed December 21, 1928. Serial No. 327,552.

This invention relates to covers for the spare tires of automobiles.

The usual spare tire cover consists of a canvas casing coated with waterproofing material and formed to fit the contour of the spare tire and carrier. These tire covers are unattractive in appearance and are subject to shrinkage so that they are difficult to apply to a tire after having been in use for a relatively short time. Such casings often cannot be applied to a tire so that they will fit the tire smoothly. They also wear out quickly and are readily torn, particularly when struck by another car, as often happens in congested traffic conditions. Such covers do not constitute a satisfactory protection for the tire against damage in case of collision. The ordinary tire cover, since it is made of highly flexible material, not only wrinkles readily, but when applied to a tire, conforms to the projections and depressions on a tire so that it does not present a smooth outer surface.

The principal objects of the present invention are to improve the construction and mode of operation of spare tire covers and to produce a cover which will present a highly attractive appearance, which will furnish a satisfactory protection for the tire, which may be readily applied to and removed from the tire and in which the parts are constructed and arranged so that they will not rattle when the cover is in use.

With these and other objects in view, the invention comprises the novel and improved features, constructions and combinations of parts hereinafter described and particularly pointed out in the claims, the advantages of which will be clearly understood and appreciated by those skilled in the art.

The invention will be clearly understood from the accompanying drawings illustrating the invention in its preferred form and the following detailed description of the constructions therein shown.

In the drawings—

Fig. 1 is a view in front elevation partly in section showing a tire carrier embodying the invention applied to a tire;

Fig. 2 is a sectional view taken substantially on the line 2—2 of Fig. 1;

Fig. 3 is a view similar to Fig. 1 illustrating a somewhat modified form of invention;

Fig. 4 is a detail sectional view of the construction shown in Figs. 1 and 2, on an enlarged scale and taken in substantially the same plane as Fig. 2; and Fig. 5 is a view similar to Fig. 4 illustrating another form of the invention.

The tire cover is shown in the drawings of this application applied to a tire 2 mounted on a rim 4. The tire cover comprises a member or section 6 arranged to cover one side of the tire and a ring section or member 8 arranged to extend about the periphery of the tire. Both of these sections are made of relatively stiff resilient sheet material and are preferably formed from sheet metal.

The section 6 of the tire cover is formed to extend inwardly from points adjacent the tread surface of the tire over the side of the tire. This section may be made in the form of a ring, and when made in this form, the section is constructed to extend inwardly to or adjacent to the inner margin of the side wall of the tire, as shown in Figs. 1 and 2. This section may also be constructed in the form of a plate extending from points adjacent the tread surface to the axis of the tire, as shown in Fig. 3. The section 6 is given a concave form in cross section on the inside thereof so as to fit over the side wall of the tire. The section may contact with the side wall at points adjacent the tread portion of the tire, as shown in Figs. 2 and 4, or it may engage the side wall at the high point in the convex portion of the wall, as shown in Fig. 5. The section when made in ring form is preferably constructed as a continuous ring as shown in Figs. 1 and 2. The material at the inner margin of the section 6 is turned back upon the body of the section as indicated at 10, to form a finished rounded edge.

The ring section 8 of the cover which is constructed to extend about the periphery of the tire has a concave form in cross section upon the inside thereof, the tread portion of the tire engaging in the concavity in this section when said section is applied to the tire, as is clearly shown in the drawings. The section 8 is so formed as to extend transversely across the tread portion of the tire and to project for some distance beyond this tread portion at its margins. With this form the section 8 will overlap the outer margin of the section 6 for some distance as shown. The material of the section 8 at the margins of said sections is turned back on the body of the section as indicated at 12, to form finished rounded edges and to reinforce the said margin.

The section 8 is made in the form of a divided ring and is constructed of a size somewhat smaller than the tire to which it is to be applied. The section is also preferably formed so that the end portions of the section indicated at 14, will be separated by a space when the section is in place on the tire, as shown in Figs. 1 and 3.

The section 8 of the cover may be formed from a strip of sheet metal stock and may be given substantially the shape shown in the drawings, by cold rolling operations. The cold rolling operation will give this section the required degree of resiliency so that it will grip the tire securely upon contraction of the section. The section 6 of the cover may be formed into substantially the shape shown in the drawings, from sheet metal stock, by stamping and rolling operations.

As above stated, the section 8 as well as the section 6, is made of resilient sheet material, and in applying the section 8 to the tire, the section is expanded so that it may be passed over the tire. Upon the release of the section the resiliency of the material will cause the same to contract so as to grip the tread portion of the tire firmly.

The section 8 when it contracts upon the tire, operates to hold the section 6 in position. As above described the section 8 overlaps the outer margin of the section 6. In order that the section 6 may be held securely in position on the tire and, at the same time, that there may be no metal to metal contact between the two sections, a contact pad or cushion 15, preferably of resilient material such as vulcanized rubber, is interposed between the two sections. This pad is preferably made in the form shown in Figs. 1, 2 and 4. As shown in these figures, this pad or cushion comprises a strip of vulcanized rubber having a body and a flange 18 projecting from the body of the strip. The cushion 15 is located between the outer margin of the section 6 and the overlapping margin of the section 8 and is preferably secured to the section 6. In order to secure the cushion to the section 6, the outer margin of said section is provided with an outwardly and reversely bent portion indicated at 20 and a portion of the body of the cushion is inserted in the recess between said reversely bent portion and the body of the section 6, and secured therein by subjecting the parts to pressure. The cushion 15 extends about the outer surface of the margin of the reversely bent portion 20 of the section 6 between the same and the adjacent margin of the section 8 so as to prevent contact between the two sections. The flange 18 of the cushion is arranged to engage the inner face of the section 8 of the cover in substantially the manner shown in Figs. 2 and 4. The cushion member is preferably so formed that the flange normally assumes the position shown in dotted lines in Fig. 4 and is bent inwardly in applying the section 6 to the tire so that the flange exerts a certain amount of pressure against the section 8 by reason of the resiliency of the rubber which is put under tension by the bending of the flange.

The cushioning member 15 may be made in the form of a strip extending completely about the section 6 of the cover, as shown in Figs. 1 and 2. If desired, however, several separate cushioning members 15 may be secured to the margin of the section 6 at spaced intervals about the same, as shown in Fig. 3.

In applying the tire cover above described to the tire, the tire and rim are preferably placed in a horizontal position on the ground, or upon any other suitable support. The section 6 is then laid upon the upper side of the tire in substantially the position shown in Fig. 2 with relation to the tire. The section 8 is then applied to the tire. In applying this section, the section is expanded so that it will pass over the peripheral portion of the tire and is positioned with the tread portion of the tire engaging in the concavity in the interior of said section and with the margins of the sections extending beyond the tread surface of the tire on each side thereof, as clearly shown in the drawings. Upon the release of the section after its expansion, the section will contact upon the tire because of the resiliency of the material and will securely grip the tread surface of the tire and will engage the cushioning member 15 so as to hold the section 6 securely in position. In the application of the section 8 to the tire in this manner, the flange 18 on the cushioning member is bent inwardly, thereby placing the rubber of the cushioning member under a certain degree of tension.

With this construction, the tire cover will accommodate itself to tires, the tread surfaces of which have varying diameters. Figs. 2 and 4 of the drawings show the section 8 of the cover contacting with the flange 18 substantially throughout the width of the flange. If the cover is applied to a tire having a larger diameter than that shown in the drawings, the section 8 will not bend the flange as far inwardly as shown, but the flange will accommodate itself to the position of the section 8 by reason of the resiliency of the flange. Thus the construction of the cushioning member will compensate for certain variations in the size of the tire to which the tire cover is applied. The section 6 of the cover is centered with relation to the tire and is held securely in position by the engagement of the section 8 with the flange 18 on the cushioning member.

The cushioning member may be made in the form shown in Fig. 5 in which the said member is indicated at 15a. The flange 18a of this cushioning member, in the construction shown in this figure, is made of sufficient width to extend over the tread surface of the tire and the flange is gripped between said tread surface and the section 8 when the cover is applied to the tire. The cushioning member is preferably so formed that the flange normally assumes the position shown in dotted lines in Fig. 5 and is bent outwardly in applying the section 6 to the tire. In this case, section 6 is held in place principally by the gripping action of the section 8 upon the flange on the cushioning member. A cover constructed in the manner shown in Fig. 5 also will accommodate itself to tires of different outside diameters as will be readily seen.

The sections 6 and 8 are held from contact with each other by the resilient cushion 15 so that there will be no objectionable rattles or other noises produced by the relative movement of the two sections during the running of the car to the spare tire of which the cover is applied. The cover may be very readily applied to and removed from the tire by simple, easy and convenient manual operations, and is securely held on the tire when applied thereto.

It is obvious that if it is desired to cover only the peripheral portion of the tire the peripheral section 8 may be employed without the side cover section 6. When the section 8 is employed alone the said section is applied to and removed from the tire in the same manner as above described.

The tire cover above described is very attractive in appearance and furnishes a reliable and satisfactory protection for the tire at all times and will protect the tire from damage in case of collision.

The tire cover occupies very little space at the side or about the periphery of the tire so that the tire with the cover applied thereto will fit in a socket or well in the running board, with which many cars are at present provided. When the tire with the cover applied is placed in the socket, the cover cannot be removed from the tire without first removing the tire from the socket. Thus the locking of the tire in the well also locks the cover in position.

It is to be understood that the terms "annular", "ring", and "ring-shaped", and similar terms which may be employed in the specification and claims of the present application to describe the shape of the tire cover members are not limited to a construction in which the member, or the part thereof described, forms a complete ring and that these terms apply to a construction in which the said member, or the part thereof described, has the form of a portion only of a ring.

It is to be understood that the invention is not limited to the particular construction and arrangement of parts of the illustrated embodiment of the invention, but that the invention may be embodied in other forms within the scope of the claims.

Having explained the nature and object of the invention and having specifically described a construction embodying the invention in its preferred form, what is claimed is:

1. A cover for the spare tires of automobiles comprising sections arranged to cover different portions of a tire and a cushioning device secured to one of said sections and interposed between the sections, said cushioning device having a flange which is bent out of its normal position when the tire cover is applied to a tire.

2. A cover for the spare tires of automobiles comprising a section arranged to cover one side of the tire, a section arranged to extend about the periphery of the tire and to overlap the first section, and a cushioning device secured to the first section and extending over the periphery of the same and having a flange extending inwardly toward the tread surface of the tire and engaged by the second section.

3. A cover for the spare tires of automobiles comprising a section arranged to cover one side of the tire, a section arranged to extend about the periphery of the tire, and a cushioning device secured to the outer margin of the first section, interposed between the same and the adjacent margin of the second section and having a flange arranged to extend between the second section and the tread surface of the tire.

4. A multipart tire cover including a side plate for disposition over a side of the tire, and a substantially circular rim formed to extend about the periphery of the tire and having an inherent resiliency toward and capable of contracting the rim to a diameter less than the normal outer diameter of the tire, said rim and said plate being so proportioned to each other that when the rim is on the tire one side of the rim is in holding engagement with said plate.

5. A multipart tire cover including a side plate portion for covering a side of the tire, and a split contractible rim portion associated therewith to extend about the outer periphery of the tire and extending from said side plate portion over substantially the entire width of the tire tread, said rim and said plate portions being so proportioned to each the contracting of the rim portion causes it to hold said side plate portion in position on the tire.

6. A multipart tire cover including a side plate for disposition over a side of the tire, a substantially circular rim formed to extend about the periphery of the tire and having an inherent resiliency tending toward and capable of contracting the rim to a diameter less than the normal outer diameter of the tire, said rim and said plate being so proportioned to each other that when the rim is on the tire one side of the rim is in holding engagement with the said plate, and cushioning means between cooperating portions of the plate and rim.

7. A multipart tire cover including a side plate for disposition over a side of the tire, and a substantially circular rim formed to extend about the periphery of the tire and having an inherent resiliency tending toward and capable of contracting the rim to a diameter less than the normal outer diameter of the tire, said rim having a portion overlying a portion of said side plate for cooperation with the latter portion when the rim is on the tire to hold the said plate in position over said side of the tire.

8. A multipart tire cover including a side plate portion of circular form for covering a side of the tire and a split circular rim portion associated therewith and formed to extend about the outer periphery of the tire and over the outer edge of said plate, the ends of said split rim being movable toward each other to clamp the rim to the tire and cause the rim to engage the plate to hold it in proper position.

9. A multipart tire cover including a side plate for covering a side of the tire and a substantially circular rim formed to extend about the outer periphery of the tire and normally having an inside diameter slightly less than that of the tire to which it is applied to enable the inherent resiliency of the rim to hold the rim on the tire and to cause the rim to also engage the said cover for retaining it in proper position on the tire.

10. In a tire cover, a component part comprising a split circular rim formed to extend about the periphery of the tire and having an inherent resiliency tending toward and capable of contracting the rim to a diameter less than the normal diameter of the tire.

11. In a tire cover, a ring-like plate formed for disposition over only a side of the tire and having its outer peripheral edge formed to extend inwardly toward and substantially up to the tread of the tire for frictional cooperation with another part of the tire cover.

12. A multipart tire cover for protecting a spare tire mounted on a tire carrier including a circular plate-like part formed to cover the outer side wall of the spare tire and a rim part made of circular form associated with said side part and projecting laterally from it across the median plane of the tire and being of a radius sufficient to enable it to snugly fit over a tire and to extend clear across substantially the entire width of the tire tread, said two parts including means for connecting them together and for holding them in place on the tire.

13. A multipart tire cover for protecting a spare tire including a metal part for covering a side of the tire, and a split circular rim part formed to extend about more than one half of the periphery of the tire and cooperating with said metal part to hold the same in proper tire protecting position on said tire.

14. A multipart tire cover for protecting a spare tire including a metal part for covering a side of the tire, a split circular rim part formed to extend about more than one half of the periphery of the tire and cooperating with said metal part to hold the same in proper tire protecting position on said tire, and cushioning means between said parts to aid in preventing rattling of the parts.

15. In a tire cover, a split circular rim of substantially concave cross section and extending substantially across the tread of the tire and formed to extend about more than one half of the outer periphery of the tire, and having an inherent resiliency tending toward and capable of contracting the rim to a diameter less than the normal diameter of the tire.

16. In a tire cover, a ring like plate formed for disposition over only a side of the tire and having its outer peripheral edge formed to extend inwardly toward and adjacent the tread of the tire in cooperation with another part, said plate having rounded peripheral inner and outer edges and cushioning means retained in position by said outer edge for engagement with said other part.

17. In a tire cover, a substantially continuous split circular metallic ring of substantially concavo convex cross section so as to fit over and extend across the tread of the tire and of such length as to extend about a sufficient amount of the outer periphery of the tire as to be movable into retaining engagement therewith, said rim including an inwardly extending marginal portion of a shallow depth such as will provide the rim with flexibility and yet permit of ready movement of the rim into retaining engagement with the tire, and a ring-like plate formed for disposition over only a side of the tire and having its outer peripheral edge formed to extend inwardly toward and adjacent the tread of the tire for cooperation with said rim.

18. In a spare tire cover a resiliently expansible and contractible split rim cooperating with other tire cover protecting means to resiliently hold the cover in tire cover engagement.

19. A metallic spare tire cover composed of an annular side portion to substantially cover the side wall of the tire and a cooperating open bottom flexible tread portion of substantially continuous sheet metal extending substantially across the tread and comprising contracting means whereby the tread portion is flexed into holding engagement with the tire for attachment thereto.

20. A metal tire cover for spare tires comprising a side part to substantially cover the outer side wall of the tire and a tread covering part extending from said side part across the tread of the tire and provided with expansible and contractible means whereby the inner circumferential side of said tread part is brought into holding engagement with the tire.

21. In a tire cover, a side portion to cover the side wall of the tire and an open ended tread covering portion extending from said side portion across the tread of the tire comprising a resilient split expansible ring to be fitted over the tread of the tire and inherently contractible upon the tire into cover holding engagement with the tire.

22. In a tire cover, a resiliently expansible and contractible split rim for covering substantially only the tread of a spare tire and to fit spare tires of various shapes and diameters formed from relatively stiff sheet material, said split rim being of such a circumferential length and cross sectional shape as to enable it to be expanded over the tread and to embrace the tire for holding engagement therewith.

Signed at New York, N. Y., this 19th day of December, 1928.

GEORGE ALBERT LYON.